United States Patent Office

3,183,104
Patented May 11, 1965

3,183,104
HIGH TENSILE STRENGTH, LOW DENSITY
GLASS COMPOSITIONS
George L. Thomas, Parma, Ohio, assignor to The B. F.
Goodrich Company, New York, N.Y., a corporation of
New York
No Drawing. Filed Oct. 26, 1962, Ser. No. 233,470
7 Claims. (Cl. 106—50)

This invention relates to glass compositions which are suitable for the manufacture of glass fibers having high tensile strength. More particularly it relates to glass compositions of low density which can be spun into strong fibers useful for reinforcement of plastic laminates and which contribute exceptional increase in strength to the laminate construction with a very small increase in the total weight thereof. Such light weight, high strength construction will be of interest in areas where the weight of materials must be kept to a minimum. This criterion applies in the aircraft industry and to an even greater degree to the construction of missiles, rockets, satellites and craft or vessels for operation in outer space.

The present day standard for high tensile strength glass fibers for use either alone or as reinforcement for plastic and resin laminated structures is commercial filament E glass. This E glass has a glass fiber tensile strength of 500,000 p.s.i. and a density of 2.54 g./cc. The glasses of my invention not only have densities of 2.33 g./cc. or less, but also surprisingly exhibit glass fiber tensile strengths 10% to 50% higher than commercial E glass.

My new glasses also have surprisingly high elastic moduli in view of their very low densities. These moduli are measured on uncompacted fiber by a standard sonic method utilizing measurement of the speed of sound transmitted through the glass as described in J. App. Physics 20, 493 (1949). They range from $12 \times 10^6$ p.s.i. to $8.9 \times 10^6$ p.s.i. as compared to commercial filament E glass which has a value of $10.8 \times 10^6$ p.s.i. A high modulus or stiff glass is desirable when the fibrous glass is to be used in plastics reinforcement. It will be realized that a glass with a density as low as 2.33 g./cc. as compared to 2.54 g./cc. for E glass and with a tensile strength of 110% to 150% that of E glass can be formed into structures or shapes stronger than similar shapes formed from E glass and equal to the E glass structure in stiffness and rigidity, even if the lighter glass has a slightly lower modulus than the E glass.

Because of their substantial improvement in tensile strength, fibers made from the glass composition of this invention are especially useful for the manufacture of glass reinforced plastic articles and particularly filament wound glass-plastic pressure vessels.

The glass compositions disclosed can be mixed, melted until they are homogeneous and air-free, formed into marbles, remelted, and drawn into fibers by conventional methods. The usual melting temperature is about 2600° F. Fibers formed from my new glass find ready application in articles where a high strength to weight ratio is important. Pressure bottles and tanks to hold liquids and gases, particularly under high pressures, are widely used in aircraft to store oxygen, hydraulic fluid, deicing fluid and the like, and any new material which will make a stronger article for the same weight, or a lighter article with the same strength as can be made with presently used materials finds ready interest and acceptance.

I have succeeded in making glass compositions of extremely high tensile strength and light weight and my glass compositions also have good spinning characteristics for drawing into continuous filament glass. They are readily spun from a platinum bushing having a commercial nozzle size and shape at temperatures between 1700° F. and 2400° F.

These glasses have liquidus temperatures which are low enough so that they can be spun under ordinary spinning conditions without the use of special nozzles, cooling or handling or any serious tendency to devitrify during the fiber forming process.

The high strength and low density of my glasses are believed to be due to their unique composition. A low density glass with high tensile strength, long spinning range, low liquidus temperature, slow rate of crystallization and normal to high Young's modulus may be made in the following composition range.

| Ingredient: | Proportion by weight |
|---|---|
| $SiO_2$ | 40.0–55.0 |
| $B_2O_3$ | 10.0–20.0 |
| $Li_2O$ | 0.1–1.0 |
| $Al_2O_3$ | 19.0–29.0 |
| MgO | 5.0–20.0 |
| BeO | 0.0–8.0 |

As is common in glass technology, the ingredients are given above in terms of oxides of the elements. The compounds may be added to the glass batch in several different forms, however. Lithium may be added as the carbonate, as can magnesium, for example.

Essential ingredients of these borosilicate glass compositions are silica and boric oxide. Both of these glass formers contribute to the low density of the new glasses. Boric oxide contributes to the meltability and low liquidus temperaures that are obtained. I have found that silica must be present in an amount at least 40.0% by weight to avoid devitrification when spinning the glass into fiber form.

The alkali oxide is employed as a flux in the glass. Lithia has a small ionic radius and relatively high field strength for alkali ions. It is also an essential ingredient of my glass. Sodium oxide ($Na_2O$) may be used alone or in addition to the lithia as the fluxing agent, but when it is used devitrification of the glass tends to occur sooner than when lithia is employed alone. Calcia has been found to be detrimental to the tensile strength and modulus and raises the density and liquidus temperature of my glass and I avoid using it.

Modifying oxides, MgO, $Al_2O_3$ and BeO are added to give the glass durability and increase the elastic modulus. Magnesia also helps to reduce viscosity. It has been found that when alumina is combined with magnesia it forms four-coordinate low density structures in the glass which contributes to the glass strength. BeO is a toxic material which may be added to the preferred high strength, low density compositions or left out, as desired. When added to a glass, beryllia will increase the modulus more than any other known oxide.

Other common modifying oxides such as CaO, ZnO, $K_2O$, BaO, $ZrO_2$, and $Fe_2O_3$ are not favored because they increase the glass density, however they may be added in small amounts if their total does not exceed about 4% by weight of the batch. The correct proportioning of MgO and $Al_2O_3$ is important. I have found that about 20.0% by weight of MgO causes the glass density to rise considerably above 2.33 g./cc. Similarly, when the ratio of $Al_2O_3$ to MgO is less than 1 to 1, the glass density rises above the 2.33 g./cc. maximum of my glasses. Ratios of $Al_2O_3$ to MgO greater than about 5 to 1 are not desirable because the glass crystallizes on spinning.

Glass densities were measured by dropping short lengths (⅛ to ¼ inch) of uncompacted fiber into a liquid gradient tube prepared by mixing a heavy liquid, tetrabromoethane, and a light liquid, alpha-bromonaphthalene, in the gradient tube according to known techniques.

The glasses of this invention have tensile strengths superior to that of commercially available filament glasses and an improved Young's modulus. They melt readily in existing glass melting units, have low liquidus temperatures and can be spun in ordinary platinum type spinning units.

To compare various batches of my glass with each other and with continuous filament E glass, I have employed a single filament tensile test as follows:

The glass batch is mixed, melted at about 2600° F. in a platinum lined 500 cc. alumina crucible set inside an electrically heated Pereny furnace and formed into cullet. The cullet is remelted at about 2200° F. in a platinum bushing and drawn into a single continuous filament through the single platinum nozzle. The same nozzle and drawing speeds are employed in all cases. The filament is drawn at the rate of 5,000 feet per minute; and a length of approximately 10" of filament is cut from the section between the nozzle and the drawing wheel during spinning. The sample is mounted on a cardboard containing 5 one inch openings along the length of the filament. The filament ends overlapping the end of the cardboard are removed and checked for diameter under a microscope. They should agree within 0.00002 inch. The filament is glued to the cardboard at the end of each opening and the cardboard is cut transversely to the filament between the openings to give 5 one inch lengths of filament which can be mounted in an Instron Testing Machine for tensile test. With every group of experimental filaments, control filaments of commercial E glass are run.

The glass composition of my invention is illustrated by the following examples wherein the ingredients are proportioned by weight.

EXAMPLES I–VII

Glass batches according to the specific compositions given below were weighed, mixed, melted in 400 ml. platinum laboratory crucibles at about 2600° F. and formed into cullet. The cullet was remelted in a platinum bushing and drawn into single filament form. Standard E glass was employed as the control. Compositions and test data are summarized in Table 1.

shows that when silica is reduced below the critical amount of 40%, the density is much higher than the maximum density of 2.33 g./cc. of the glasses of my invention.

I claim:
1. A low density aluminum borosilicate glass fiber having a composition consisting of in percent by weight:

| | |
|---|---|
| $SiO_2$ | 40–55 |
| $B_2O_3$ | 10–20 |
| $Li_2O$ | 0.1–1 |
| MgO | 5–20 |
| $Al_2O_3$ | 19–29 |
| BeO | 0–8 | having an uncompacted fiber density of less than 2.33 g./cc. and a fiber tensile strength of from 576,000 to 730,000 p.s.i., and wherein the ratio of $Al_2O_3$/MgO is between 1:1 and 5:1.

2. A low density aluminum borosilicate glass fiber having a composition consisting of in percent by weight:

| | |
|---|---|
| $SiO_2$ | 40–55 |
| $B_2O_3$ | 10–20 |
| $Li_2O$ | 0.1–1 |
| MgO+$Al_2O_3$ | 24–49 | having uncompacted fiber density less than 2.33 g./cc. and a fiber tensile strength of from 576,000 to 730,000 p.s.i., and wherein the ratio of $Al_2O_3$/MgO is between 1:1 and 5:1.

3. A low density glass composition suitable for spinning into fiber form consisting in parts by weight of:

| | |
|---|---|
| $SiO_2$ | 45.5 |
| $B_2O_3$ | 19.0 |
| $Li_2O$ | 0.5 |
| MgO | 17.5 |
| $Al_2O_3$ | 17.5 |

4. A low density glass composition suitable for spinning into fiber form consisting in parts by weight of:

| | |
|---|---|
| $SiO_2$ | 45.5 |
| $B_2O_3$ | 19.0 |
| $Li_2O$ | 0.5 |
| MgO | 10.6 |
| $Al_2O_3$ | 24.4 |

5. A low density glass composition suitable for spinning into fiber form consisting in parts by weight of:

| | |
|---|---|
| $SiO_2$ | 50.75 |
| $B_2O_3$ | 17.2 |
| $Li_2O$ | 0.45 |
| MgO | 6.3 |
| $Al_2O_3$ | 25.3 |

*Table 1*

| | Control E glass | I | II | III | IV | V | VI | VII |
|---|---|---|---|---|---|---|---|---|
| $SiO_2$ | | 45.5 | 45.5 | 50.75 | 47.7 | 42.0 | 49.4 | 36.5 |
| $B_2O_3$ | | 19.0 | 19.0 | 17.2 | 14.2 | 18.2 | 10.1 | 20.6 |
| $Li_2O$ | | 0.5 | 0.5 | 0.45 | 0.3 | 0.5 | 2.1 | 1.0 |
| MgO | | 17.5 | 10.6 | 6.3 | 15.6 | 12.7 | 18.0 | 19.6 |
| $Al_2O_3$ | | 17.5 | 24.4 | 25.3 | 22.2 | 19.5 | 20.4 | 22.3 |
| BeO | | | | | | 6.6 | | |
| $Fe_2O_3$ | | | | | | 0.5 | | |
| Uncompacted fiber density, g./cc | 2.54 | 2.33 | 2.05 | 2.00 | 2.20 | 2.20 | 2.47 | 2.44 |
| Tensile, p.s.i. × 1,000 | 500 | 587 | 576 | 589 | 633 | 730 | 548 | 506 |
| $Al_2O_3$/MgO | | 1.0 | 2.3 | 4.0 | 1.43 | 1.54 | 1.11 | 1.14 |
| Modulus, × 10⁶ | 10.8 | 10.9 | 9.1 | 9.0 | 10.6 | 11.9 | 12.3 | 11.9 |

Examination of the data in Table 1 indicates that Examples I–V are glass compositions in the range of my invention and show densities of 2.33 g./cc. or less associated with tensile strengths ranging from 115% to 146% that of the commercial E glass control. Example VI illustrates that when too much lithia is employed, the density is severely increased and Example VII similarly 6. A low density glass composition suitable for spinning into fiber form consisting in parts by weight of:

| | |
|---|---|
| $SiO_2$ | 47.7 |
| $B_2O_3$ | 14.2 |
| $Li_2O$ | 0.3 |
| MgO | 15.6 |
| $Al_2O_3$ | 22.2 |

7. A low density glass composition suitable for spinning into fiber form consisting in parts by weight of:

| | |
|---|---|
| $SiO_2$ | 42.0 |
| $B_2O_3$ | 18.2 |
| $Li_2O$ | 0.5 |
| $MgO$ | 12.7 |
| $Al_2O_3$ | 19.5 |
| $BeO$ | 6.6 |
| $Fe_2O_3$ | 0.5 |

References Cited by the Examiner

UNITED STATES PATENTS

| | | | |
|---|---|---|---|
| 2,834,738 | 5/58 | Vincent | 106—54 |
| 2,978,341 | 4/61 | Bastian | 106—50 |
| 3,095,311 | 6/63 | Von Wranau et al. | 106—50 |

FOREIGN PATENTS

| | | |
|---|---|---|
| 124,553 | 6/47 | Australia. |
| 765,244 | 1/47 | Great Britain. |

TOBIAS E. LEVOW, *Primary Examiner.*